(12) United States Patent
Bryan et al.

(10) Patent No.: US 10,376,058 B2
(45) Date of Patent: Aug. 13, 2019

(54) AUTOMATED MOTORIZED MODULAR SHELF SYSTEM

(71) Applicant: Walmart Apollo, LLC, Bentonville, AR (US)

(72) Inventors: Greg A. Bryan, Bentonville, AR (US); Cristy Brooks, Cassville, MO (US); Benjamin D. Enssle, Bella Vista, AR (US); David Blair Brightwell, Bella Vista, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/926,659

(22) Filed: Mar. 20, 2018

(65) Prior Publication Data

US 2018/0271281 A1   Sep. 27, 2018

Related U.S. Application Data

(60) Provisional application No. 62/475,273, filed on Mar. 23, 2017.

(51) Int. Cl.
*A47B 96/02* (2006.01)
*A47B 57/06* (2006.01)
(Continued)

(52) U.S. Cl.
CPC ............. *A47B 96/025* (2013.01); *A47B 57/06* (2013.01); *A47F 3/06* (2013.01); *A47F 1/125* (2013.01); *A47F 5/10* (2013.01); *A47F 5/103* (2013.01); *G01G 19/4144* (2013.01); *G01G 19/42* (2013.01)

(58) Field of Classification Search
CPC ......... A47B 96/025; A47B 57/06; A47F 3/06; A47F 5/10; A47F 5/103
See application file for complete search history.

(56) References Cited

U.S. PATENT DOCUMENTS

| 3,982,801 A | 9/1976 | Heidorn et al. |
| 5,359,191 A | 10/1994 | Griesemer et al. |

(Continued)

FOREIGN PATENT DOCUMENTS

| CN | 203294637 U | 11/2013 | |
| DE | 10155588 A1 * | 4/2003 | ........... A47B 57/045 |

(Continued)

OTHER PUBLICATIONS

International Search Report and Written Opinion dated Jun. 11, 2018 in corresponding International Application No. PCT/US18/23377 (11 pp).

*Primary Examiner* — Stanton L Krycinski
(74) *Attorney, Agent, or Firm* — Venable LLP; Jeffri A. Kaminski

(57) ABSTRACT

A system and method are disclosed for motorized modular shelf organization. The system and method includes a gondola rack with a plurality of longitudinal shelves which engage with an upright support on the gondola rack, and are capable of moving vertically via a motorized element. The gondola rack also includes at least two support arms which are capable of grasping the plurality of longitudinal shelves and moving the plurality of longitudinal shelves laterally and vertically so that the longitudinal shelves may swap positions with another shelf.

10 Claims, 10 Drawing Sheets

(51) Int. Cl.
*A47F 3/06* (2006.01)
*G01G 19/414* (2006.01)
*A47F 1/12* (2006.01)
*A47F 5/10* (2006.01)
*G01G 19/42* (2006.01)

(56) References Cited

U.S. PATENT DOCUMENTS

| | | | |
|---|---|---|---|
| 5,799,588 A | 9/1998 | Engel | |
| 6,065,821 A | 5/2000 | Anderson et al. | |
| 6,976,598 B2 * | 12/2005 | Engel | A47B 57/06 211/175 |
| 7,178,890 B2 * | 2/2007 | Park | A47B 57/06 312/408 |
| 7,743,930 B2 | 6/2010 | Krohn | |
| 8,047,623 B2 * | 11/2011 | Kang | A47B 57/06 312/408 |
| 8,135,482 B2 | 3/2012 | Caldwell et al. | |
| 8,424,983 B1 | 4/2013 | Strauss et al. | |
| 8,616,388 B2 * | 12/2013 | Butler | A47B 43/00 108/106 |
| 9,044,089 B1 * | 6/2015 | Sandhu | A47F 5/0093 |
| 9,326,599 B1 | 5/2016 | Sowers | |
| 9,420,881 B2 | 8/2016 | Reid et al. | |
| 9,518,776 B2 * | 12/2016 | Baldo | F25D 25/02 |
| 9,593,481 B2 * | 3/2017 | Gosling | A47B 96/02 |
| 2008/0093313 A1 | 4/2008 | Huber | |
| 2008/0246382 A1 * | 10/2008 | Kang | A47B 57/06 312/408 |
| 2012/0031867 A1 | 2/2012 | Weyler et al. | |
| 2012/0248046 A1 * | 10/2012 | Warner | A47B 51/00 211/1.57 |
| 2013/0341122 A1 | 12/2013 | Maurer et al. | |
| 2015/0096950 A1 | 4/2015 | Engel | |
| 2015/0170258 A1 | 6/2015 | Kulig et al. | |
| 2017/0327048 A1 * | 11/2017 | Fern ndez | A47B 57/06 |

FOREIGN PATENT DOCUMENTS

| | | | | |
|---|---|---|---|---|
| DE | 102016223183 A1 * | 5/2018 | | A47F 3/06 |
| DE | 102017001178 A1 * | 5/2018 | | A47F 3/043 |
| EP | 2476635 A1 | 7/2012 | | |

* cited by examiner

AUTOMATED MOTORIZED MODULAR SHELF SYSTEM

BACKGROUND

1. Technical Field

The present disclosure relates to a motorized modular shelf system and more specifically to the utilization of the motorized modular shelf system in a gondola rack.

2. Introduction

Retail shelving systems are found in almost every store and supermarket. Shelves may be standardized such that the shelves are not removable, and the entire rack cannot be customized. Retail shelving as described does not allow for customized shelving components being mixed within a single vertical support plane. Once installed, the installed shelving components are static, meaning they cannot be changed without removing the entire component from the hooks which attach to the vertical plane.

In other types of shelving, the shelving bays are held together by vertical, back panels which hold the individual shelves. In many cases, the vertical panels are plain, meaning just a flat surface, but perforated vertical panels are available which can allow pegboard hooks for hanging products. The vertical panel often has holes running vertically, with the holes being used to engage with hooks in the shelving, such that individual shelves can be adjusted to fit as desired. When circumstances require a different storage system, such as a basket, or a gravity-fed can storage system, the entire shelf must be removed and replaced with the alternative unit hooking into the vertical panel.

A "gondola rack" may be used, where the gondola rack comprises a shelving system that is preferably mobile and easily modified. The modular framework of the gondola rack may include a notched vertical panel that supports modular shelves having hooked tabs that may be inserted in the notches on the vertical panel. In this way, shelving may be configured to be interchangeable and modular. The display components can be combined with other display components resulting in different combinations of display components within the space normally devoted to a single shelf (i.e., the space between the hanging holes of the vertical plane). Additionally, the display components can be removed and replaced within the modular shelving framework described herein, without the entire shelf being removed.

Shelving may be optimally reorganized or restocked for reasons like seasonal events, holidays, and/or emergency or weather situations. For instance, a particular shelf arrangement may be designed based on perceived user interest in items due to the season, size and weight of the items, and the expected eye-level of a target customer. In this way, shelf arrangement design plans may be based on the time of the day, time of the month, characteristics of the retail items, shopper demographics, and other considerations. The arrangement may be designed to be implemented in a number of stores world-wide, regionally, or simply at a single store.

However, restocking and reorganizing shelving on a gondola rack can be extremely time consuming and require significant personnel staffing, particularly for large retail displays. Also, due to the varying size and weight of retail items, personnel may not know where to place certain shelves to accommodate all the retail items, which may waste time and also result in inefficient displays. Further, shelf designs may be hard to understand or implement by personnel, as plans may be particularly detailed and the notches in the vertical panel are often close together and are great in number. Further, as items are removed by customers off the shelves, this leaves available retail items towards the back of the shelf, and the items may be out of view, but reorganizing the shelves can be time consuming.

Thus, there is a need for a simple modular shelf organization system, where restocking and reorganizing the shelving may be automated.

SUMMARY

A modular shelf organization system is disclosed, where the modular shelf organization system includes a gondola rack; one or more upright support members associated with the gondola rack, wherein the gondola rack is connected to a communication network; a plurality of longitudinal shelves associated with the gondola rack and configured to engage with the one or more upright support members, wherein each longitudinal shelf is capable of moving in a vertical direction along the one or more upright support member; at least one motor that drives the movement of the plurality of longitudinal shelves; at least two support arms, wherein the support arms are capable of grasping a first shelf of the plurality of longitudinal shelves that is located above a second shelf of the plurality of the longitudinal shelves, and shifting the first shelf laterally such that no portion of the shelf is located at the same vertical plane as any of the other shelves, wherein the at least two support arms are further capable of moving vertically to adjust the height of the first of the plurality of longitudinal shelves, and retract such that the first shelf is located below the second shelf.

A method for modular shelf organization of a gondola rack is disclosed, the method including providing a gondola rack comprising one or more upright support members associated with the gondola rack, wherein the gondola rack is connected to a communication network; engaging a plurality of longitudinal shelves with gondola rack by engaging each of the plurality of longitudinal shelves with the one or more upright support members; moving one or more of the plurality of longitudinal shelve in a vertical direction along the one or more upright support members, comprising energizing at least one motor; grasping a first shelf of the plurality of longitudinal shelves that is located above a second shelf of the plurality of the longitudinal shelves with at least two support arms, and extending the at least two support arms laterally such that no portion of the first shelf is located at the same vertical plane as any of the other shelves, moving the at least two support arms vertically to adjust the height of the first shelf, and retracting the at least two support arms such that the first shelf is located below the second shelf.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

A system and method are disclosed for an automated motorized shelving system.

Various embodiments of the disclosure are described in detail below. While specific implementations are described, it should be understood that this is done for illustration purposes only. Other components and configurations may be used without parting from the spirit and scope of the disclosure.

The systems, devices, and methods of the present invention are directed to an automated motorized shelving system within a gondola rack. Descriptions of the automated motorized shelving system may be applied to any other type of shelving.

Figure 1:
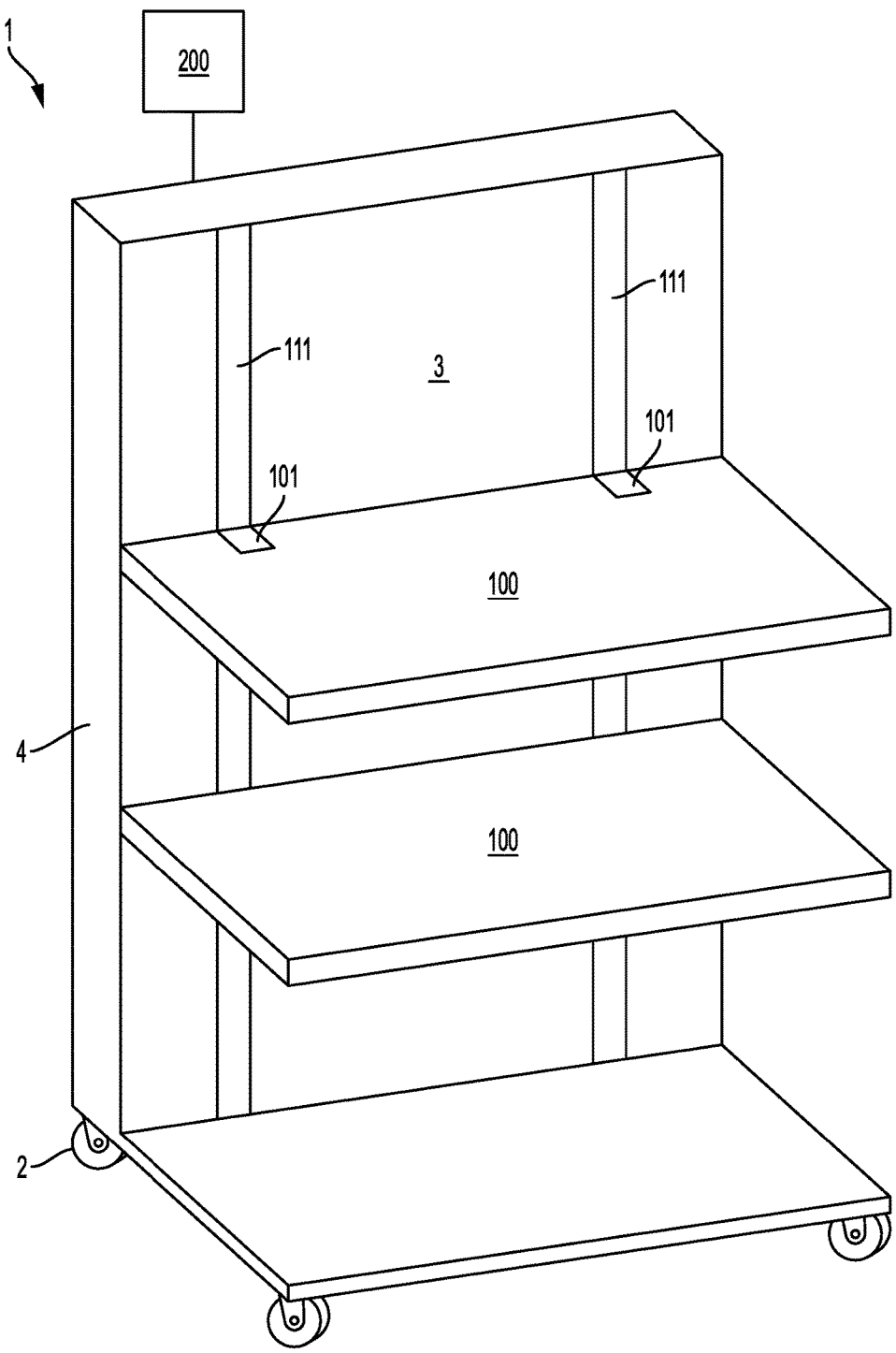
FIG. 1 illustrates an exemplary motorized modular shelf rack of the described system.

FIG. 1 shows an exemplary configuration of an exemplary motorized shelf and gondola rack as disclosed herein. The gondola rack 1 may include one or more shelves 100, which may comprise various display components. The gondola rack 1 may include one or more upright supports 4 and a rear upright support 3. The shelves 100 may be attached to one or more tracks 111 located on an interior facing surface of the rear upright support 3. In an embodiment, the shelves 100 may comprise one or more motorized elements 101 that engages with the track 111. As can be understood by one of ordinary skill in the art, the motorized elements 101 may cause the shelf 100 to move up and down vertically in relation to the track 111. In another embodiment, the tracks 111 each contain a motorized element that moves up and down vertically and cause the shelves 100 to move when the shelves 100 are engaged with the track 111. The gondola rack may also include wheels 2 or another mobilization means that allows the gondola rack to move from location to location within a retail environment.

Figure 2:
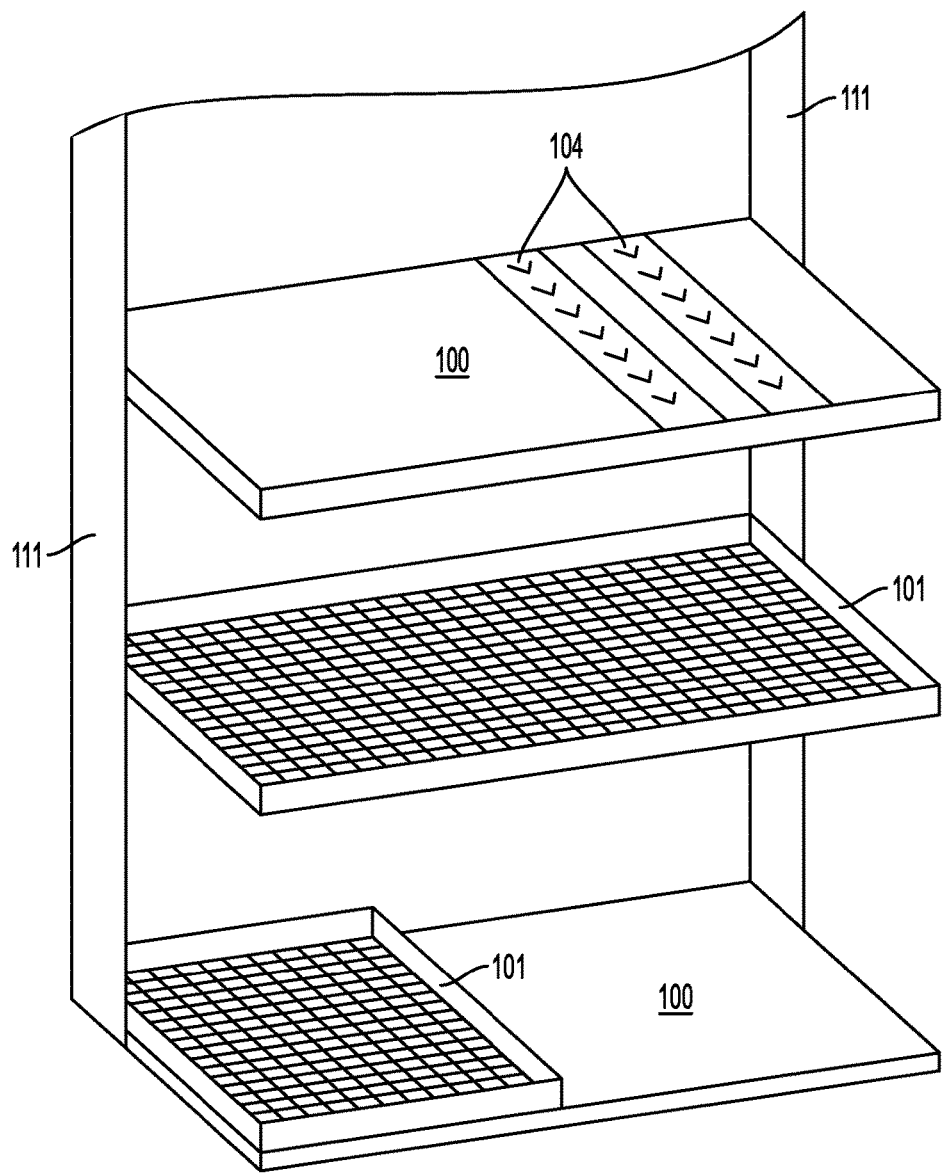
FIG. 2 illustrates an example configuration of the modular shelving for the motorized modular shelf rack.

FIG. 2 shows an exemplary configuration of the interchangeable modular framework on a motorized modular shelf. The interchangeable modular framework may include display components like a shelf component 100 or a basket component 102. The shelf component 100 may also be configured to include a basket 102. Each of the shelf component 100 or basket component 102 may engage with a track 111 located on the gondola rack 1, such that the shelf component or basket component may move along the track 111. The shelf or basket components may have gears, pegs, or other engagement mechanisms 103 which can be used to engage with the track 111 as part of a gondola shelving system, or "gondola rack."

In this example, three components 100/102 are included in the gondola rack. In some configurations, the interchangeable modular framework may be configured to leave gaps within the framework, such as when there is space for three display components but only two are utilized. In other configurations, there may be more than two display components. The display components 100/102 may be preloaded with retail items, and may also include conveyors 104 that allow for retail items to be brought forward, when a customer removes an item. The display components 100/102 may also include one or more weight sensors that determine the load on a particular component, as well as a computer processor that receives information from the weight sensors. The display components 100/102 may be configured to provide an indication that a component is overloaded, or may also provide an indication as to the specific load on the component. The display component 100/102 may also be configured to determine the number of items placed on the component, based on changes in the determined load on the component.

Figure 3A:
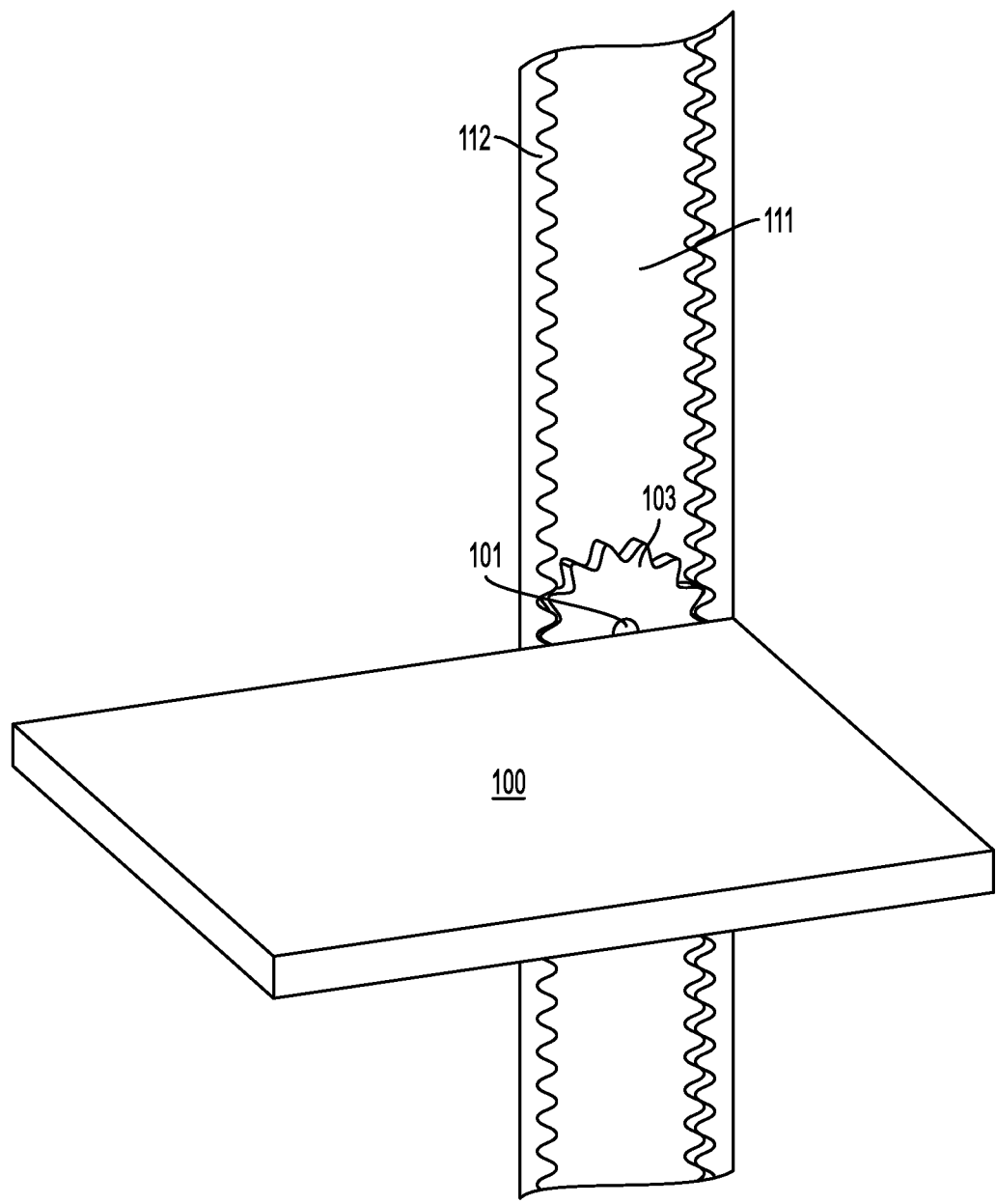
FIG. 3A shows an exemplary configuration of the drive track utilized in conjunction with the exemplary motorized modular shelving.

The track 111 can be configured in various ways as understood by those of ordinary skill in the art. For instance, the track 111 may be configured as a gear, belt, or chain system. FIG. 3A depicts a belt or chain driven motorized system and track 111, with motorized elements 115. An engagement mechanism 103 may attached to the belt or chain 114, so that when the belt or chain 114 rotates, the shelf may move up or down vertically.

Figure 3B:
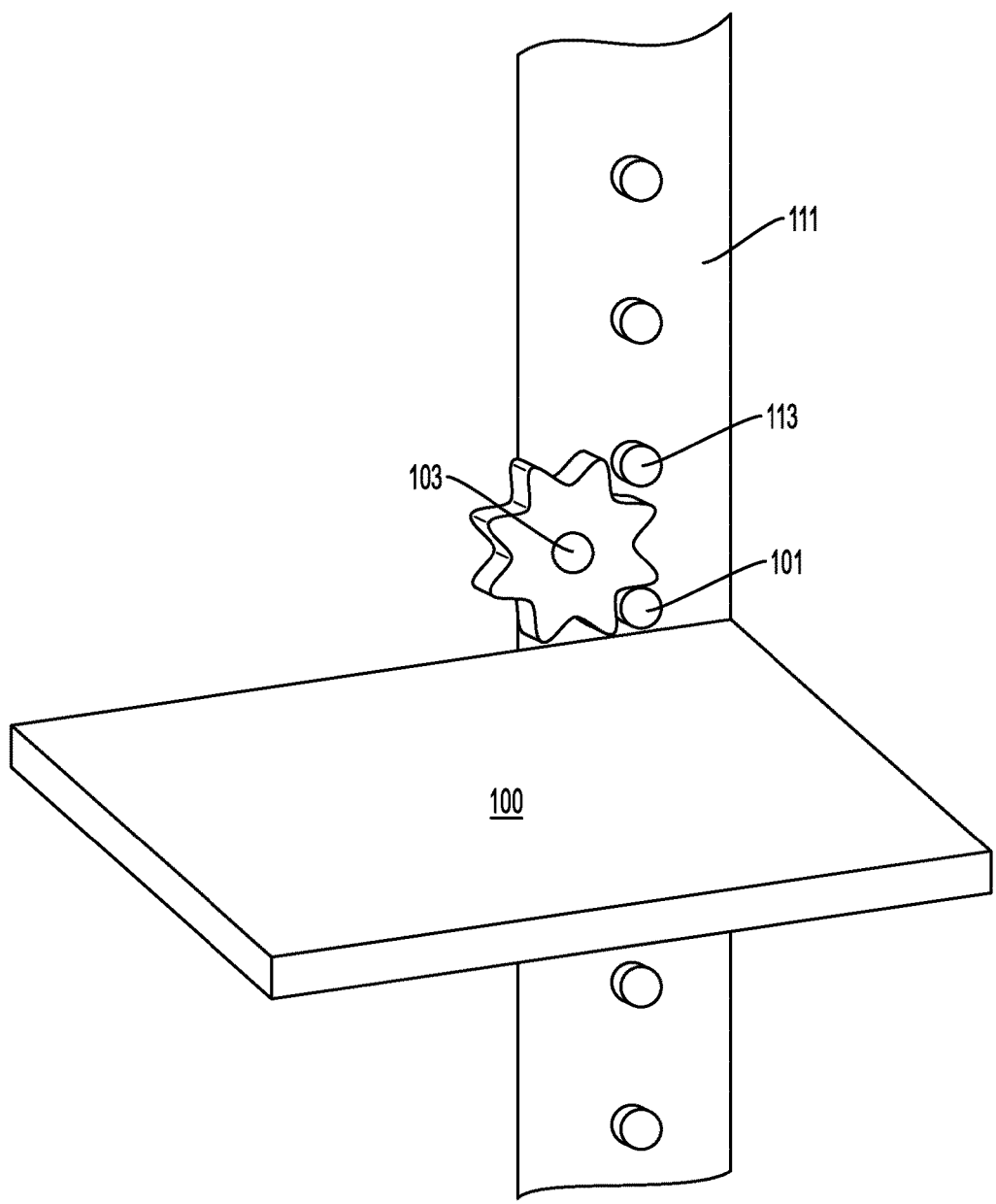
FIG. 3B illustrates an exemplary configuration of the shelf engagement elements in conjunction with the exemplary motorized modular shelving.

FIG. 3B shows an exemplary configuration of the engagement mechanism 103. As discussed above, the display components may include an engagement mechanism 103 that engaged with the track 111 on the gondola rack 1. The engagement mechanism 103 can be driven by a motorized element 101 that allows the display component to move along the track 111. In an embodiment, the engagement mechanism 103 can be a gear, and the track may include teeth 112 that are configured to engage with the engagement mechanism 103. The motorized element 101 may drive the engagement mechanism 103 to rotate, which causes the display component 100/102 to move along the track 111. Positive rotation of the engagement mechanism 103 may cause the display component 100/102 to rise, and negative rotation of the engagement mechanism 103 may cause the display component 100/102 to lower on the track 111.

Figure 3C:
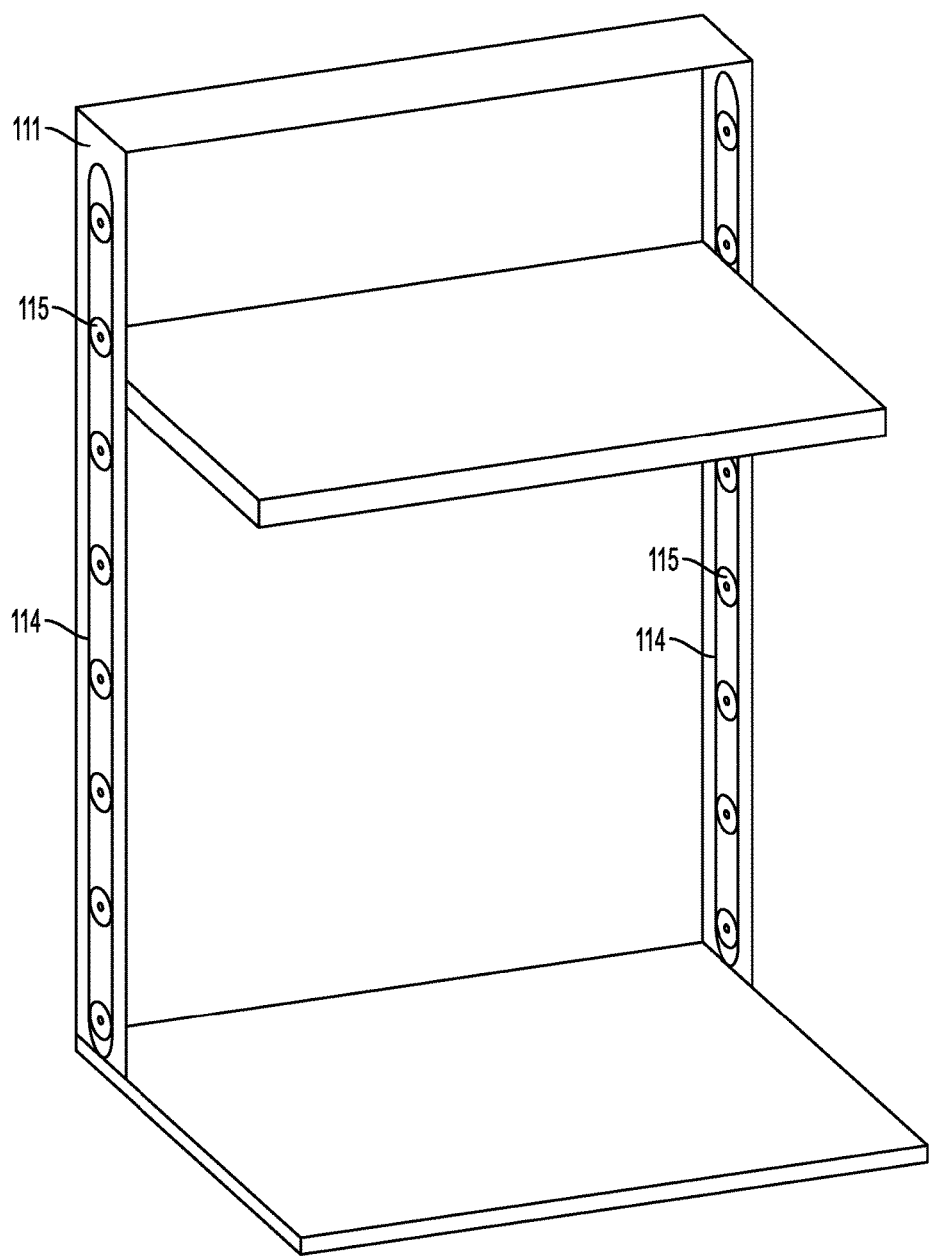
FIG. 3C illustrates an exemplary configuration of the shelf engagement elements in conjunction with the exemplary motorized modular shelving.

FIG. 3C shows an exemplary configuration of the engagement mechanism 103. In an embodiment, the engagement mechanism 103 may include a plurality of pegs located on a rotating drum. The track may include notches 113 that are configured to engage with the pegs of the engagement mechanism 103. The motorized element 101 may drive the engagement mechanism 103 to rotate, which causes the display component 100/102 to move along the track 111. Positive rotation of the engagement mechanism 103 may cause the display component 100/102 to rise, and negative rotation of the engagement mechanism 103 may cause the display component 100/102 to lower on the track 111.

In an embodiment, the shelf may be disengaged from the track 111. For example, the engagement mechanism 103 may disengage from the track 111, so that the shelf may be removed. For instance, the engagement mechanism 103 may be configured to retract in a direction towards the display component 100/102, so that the engagement mechanism 103 is no longer engaged with the track 111. In an embodiment, the engagement mechanism 103 may disengage from the display component 100/102, so that the display component 100/102 is no longer engaged with the track 111.

Figure 4:
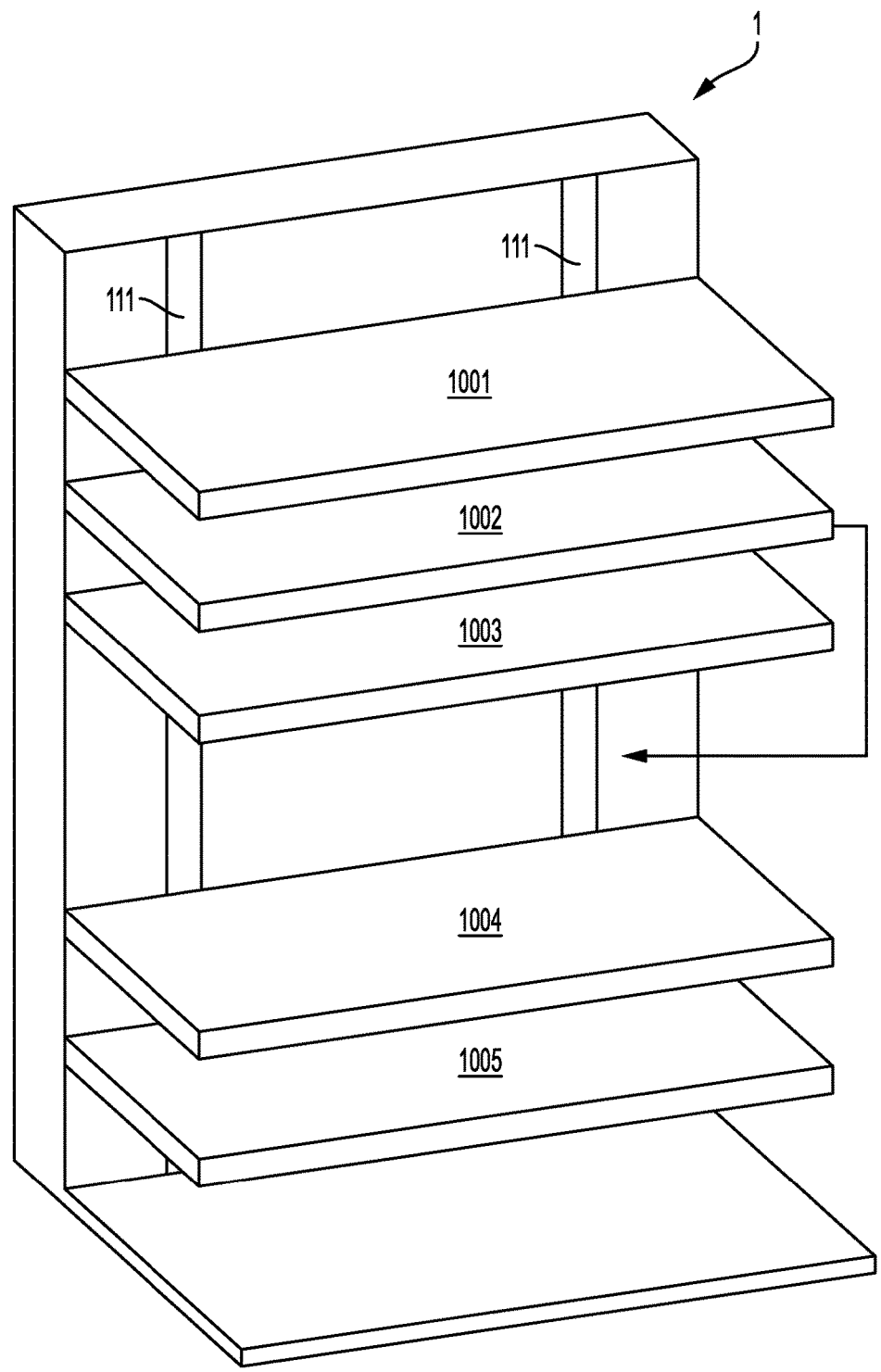
FIG. 4 illustrates an exemplary configuration for swapping motorized shelving elements.

The display component 100/102 may be removed manually by a user, once it is disengaged. The user may then swap the display component 100/102 with another component. The new display component 100/102 may be pre-loaded with retail items. In an embodiment, the removed display component 100/102 may be placed manually at a different height, above or below other display components. For example, as shown in FIG. 4, where a gondola rack is loaded with five display components (1001, 1002, 1003, 1004, and 1005), a second display component 1002 may be disengaged from track 111, removed from the gondola rack, and then placed below a third display component 1003.

Figure 5:
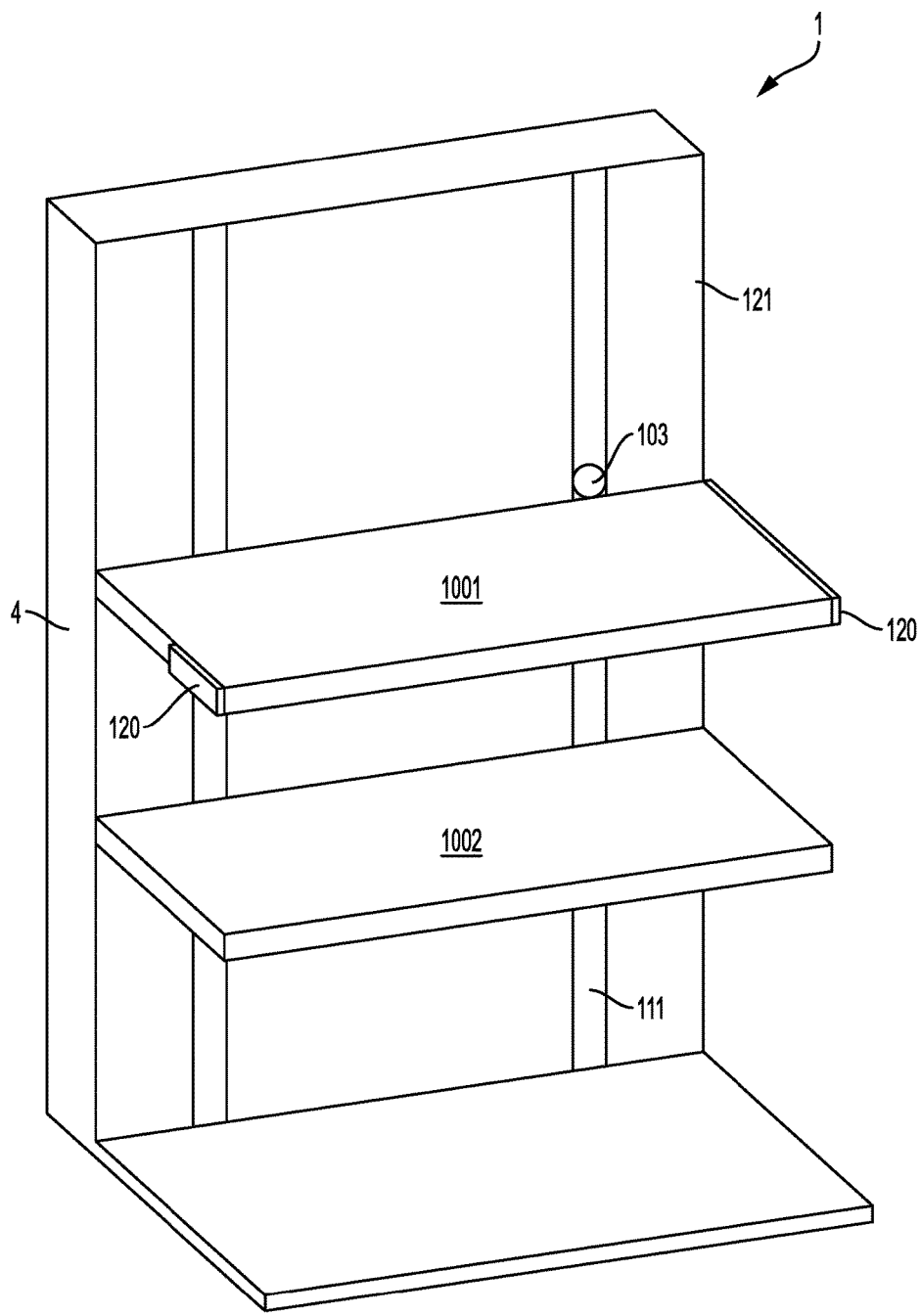
FIG. 5 illustrates an exemplary configuration of the support arm elements in conjunction with the exemplary motorized modular shelving.

In an embodiment shown in FIG. 5, the gondola rack may be configured to automatically remove and replace shelves. The upright supports 4 of the gondola rack 1 may each include a support arm track 121 which extends vertically along the inward-facing surface of the upright support 4. A support arm 120 may be engaged with the support arm track 121 on each upright support 4. The support arm may be engaged by any means understood in the art, including a gear mechanism as described with respect to engagement mechanism 103. The support arm may include a motorized element 122 which may drive the support arm to move along the support arm track 121. The support arm 120 may be configured to engage a display component 100/102. In an embodiment, the support arm 120 may be configured to extend in a direction towards the display component 100/102, so that the support arm 120 engages with one or more surfaces of the display component 100/102.

Figure 6A:
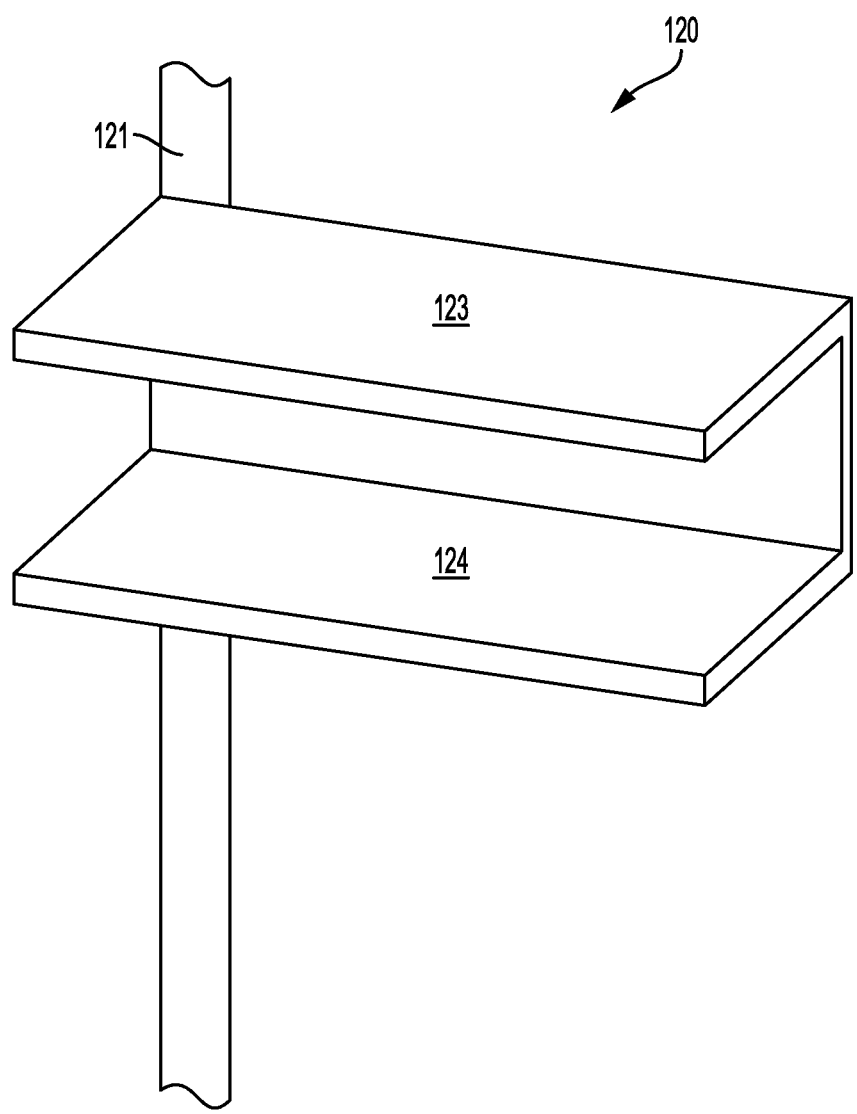
FIG. 6A shows an exemplary configuration of the support arm utilized in conjunction with the exemplary motorized modular shelving.

As shown in FIG. 6A, the support arm 120 may have a clamp-like shape, with an upper gripping surface 123 and a lower gripping surface 124. In an embodiment, the upper and lower gripping surfaces 124 may also be motorized so as to clamp down on a surface of the display component 100/102. The support arm 120 may have any configuration, as understood by one of ordinary skill in the art, to grip and remove a display component 100/102.

Figure 6B:
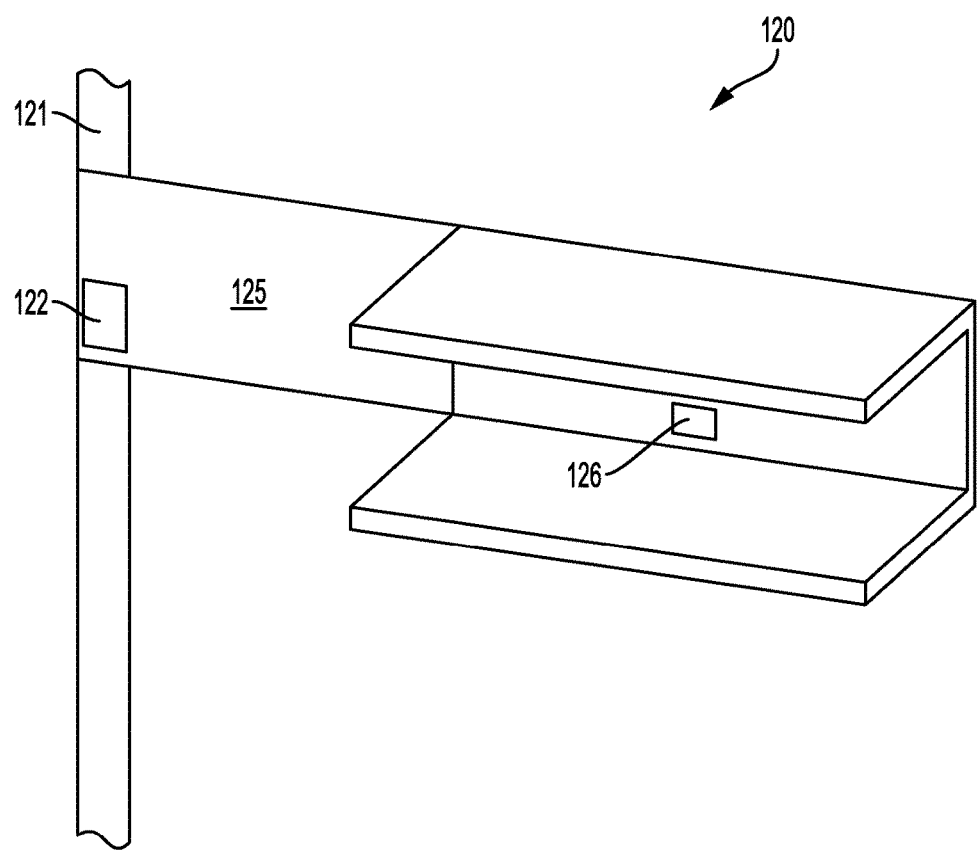
FIG. 6B shows an exemplary configuration of the support arm utilized in conjunction with the exemplary motorized modular shelving.

Further, as shown in FIG. 6B, the support arm 120 may further include an extension portion 125. In an embodiment, the extension portion 125 engages with the support arm track 121. The support arm 120 may move along the extension portion 125 such that the support arm 120 extends past the upright supports 4 of the gondola rack 1. The support arm 120 includes the motorized element 126 which drives the movement of the support arm 120 along the extension portion 125.

In this manner, the support arms may be configured to move up and down vertically along the tracks 121, so that they are aligned with a particular display component 100/102. The support arms may then be configured to extend laterally towards the display component 100/102, and engage with the display component 100/102. In one example, the support arms may rotate with respect to the upright support 4. For example, the support arm may rotate between a first position where it is aligned longitudinally with the upright support 4 and a second position where it extends essentially perpendicular to the upright support 4. Once the display component 100/102 is engaged on both sides by each support arm 120, the display component 100/102 may disengage from the track 111, as discussed above. The support arms 120 may then both extend away from the rear upright support 3 of the gondola rack utilizing the extension portion 125, so that the shelf is located outside the gondola rack. Once no portion of the shelf overlaps with the other display components 100/102 within the gondola rack, the support arms 120 may move up or down vertically along the tracks 121 to the desired height. Once the desired height is reached, the support arms 120 may retract towards the rear upright support 3 of the gondola rack along the extension portion 125, so that the display component 100/102 returns to the desired location within the gondola rack. Furthermore, when a particular display component 100/102 is located in an extended position as described, other display components 100/102 may also move up and down vertically along the tracks 111. A display component 100/102 may also be removed in this manner, where a user or automated device outside of the gondola rack 1 may grip the display component 100/102 prior to release by the support arms 120. It is understood by one of ordinary skill in the art that support arms 120 may also be configured to extend and move in a vertical direction such that a display component 100/102 may be placed on the floor. In this manner, a shelf may be removed by an automated system and taken off the retail floor.

Particular movements of the display components 100/102 may be determined by a central server 200 that is connected either wirelessly or though wired communication with the gondola rack 1. For instance, a universal retail design plan for stores may be determined at a central location, and transmitted via a central server 200 to the gondola rack 1. The central server 200 may transmit information about specific heights that each display component should be relocated to, as well as information about swapping particular shelves. The central server 200 may be any computer processing and signal transmitting device, as understood by one of ordinary skill in the art. Further, in an embodiment, the central server 200 may include handheld devices including phones or handsets, so that an onsite user may control the movement of the motorized shelving. It is understood that central server 200 may utilize various communication methods to communicate with the gondola rack 1, including WiFi, wired LAN, radio, and satellite communication.

In an embodiment, a computer processor in the gondola rack 1 determines the particular processes necessary to achieve a desired configuration. For instance, the computer processor may determine the length of runtime for each of the motorized elements 101, 122, 126, in order to reach a particular position. The display components 100/102 may also include proximity sensors that may be used to determine whether a particular positioning request of the display component 100/102 is possible. Further, the computer processor on the display components 100/102 may utilize the proximity sensors to determine if obstructions exit. If so, the display components 100/102 may be configured to alert a user to an obstruction, or adapt the movement patterns of the shelf to avoid the obstruction.

Thus, the motorized modular shelving system may be used to fully automate a retail shelving display. The shelves may be reorganized according to a centrally determined plan automatically, and may be automatically reorganized and swapped to accommodate for expected customer preferences, according to the time of day, week, month, year, or other preferences. Shelves with outdated retail items or empty shelves may be swapped out with new shelves and removed from the retail floor.

Figure 7:
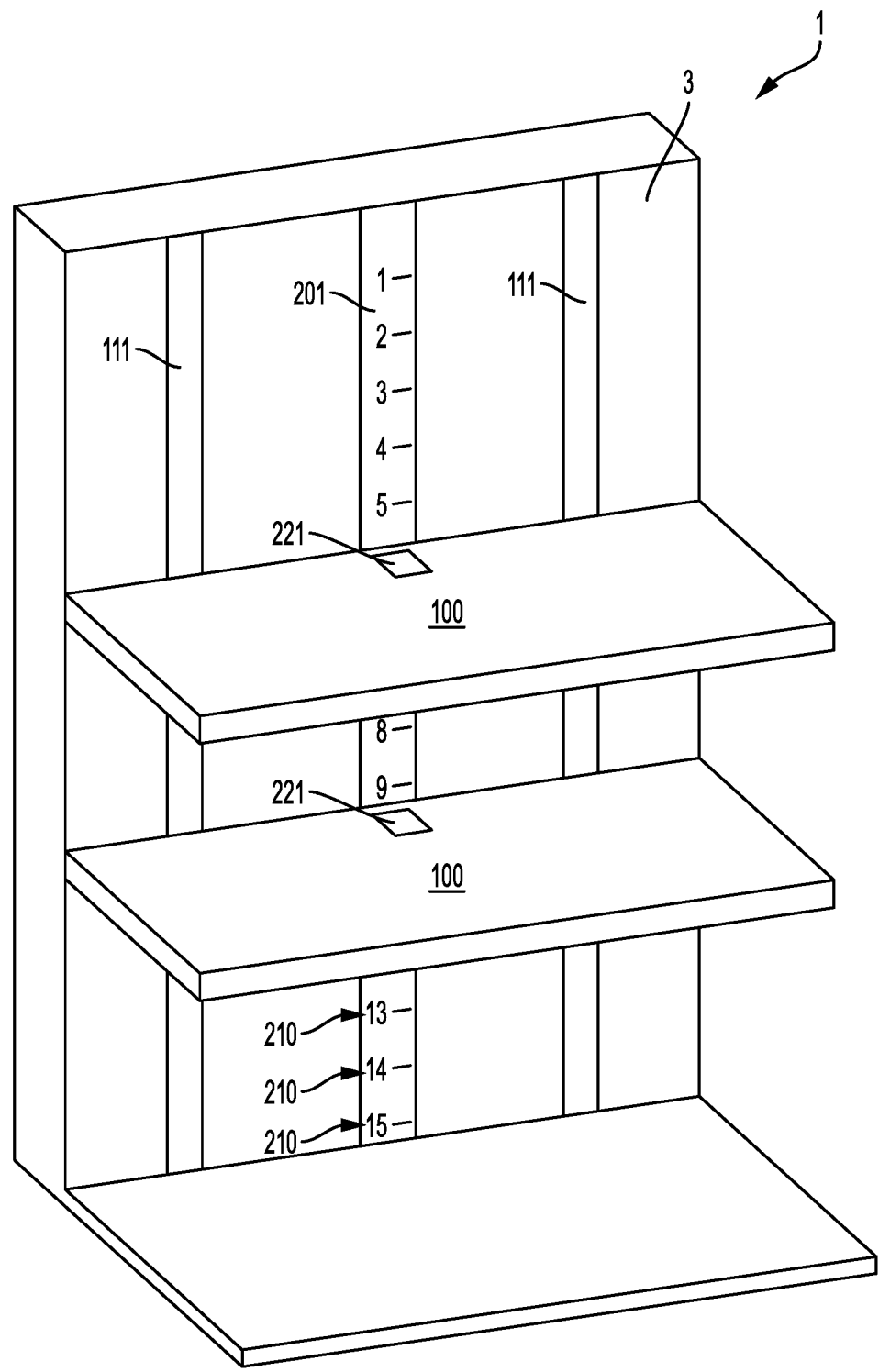
FIG. 7 shows an exemplary configuration of notch identification tape in conjunction with the exemplary motorized modular shelving.

Further, as shown in FIG. 7, the motorized modular shelves of the described invention may be utilized with the notch identification tape as described in U.S. patent application Ser. No. 62/478,983. In this situation, the notch identification tape 201 may be attached to the rear upright support 3 of the gondola rack 1, such that one or more of the identification markers 210 on the tape 201 may be aligned with a reference point on the rear upright support 3. In an embodiment, the motorized shelves may be moved by a user, using the identification markers 210 on the notch identification tape 201 as references for how far to move the shelf. In this manner, the user may begin to move a particular shelf and then continue to move the shelf until it is aligned with a particular identification marker 210.

The notch identification tape 201 may also be utilized with motorized modular shelves that are capable of being moved automatically. The notch identification tape 201 may be attached to the rear upright support 3 of the shelf, such that one or more of the identification markers 210 on the tape 201 may be aligned with a reference point on the rear upright support 3. Movement of the display component 100/102 may be guided by the notch identification tape 201. For example, the notch identification tape 201 may be equipped with sensor trigger elements, each located at one or more of the identification markers 210, so that a sensor 221 on the display component 100/102 may be triggered when the shelf is aligned with the sensor trigger element and identification marker 210. This may assist with more precise automatic movement of the display component 100/102.

The sensor trigger element and sensors 221 may utilize any sensor technology known in the art. For instance, the sensor trigger element may utilize RFID or infrared to trigger a sensor. The sensor trigger element may be embedded in the notch identification tape 201, or placed on the surface of the notch identification tape. The sensor trigger element may be included in the identification marker 210. Alternatively, the rear upright support 3 or the upright supports 4 may include embedded sensor trigger elements.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A modular shelf organization system, the modular shelf organization system comprising:
    a gondola rack;
    one or more upright support members associated with the gondola rack, wherein the gondola rack is connected to a communication network;
    a plurality of longitudinal shelves associated with the gondola rack and configured to engage with the one or more upright support members, wherein each longitudinal shelf is capable of moving in a vertical direction along the one or more upright support member;
    at least one motor that drives the movement of the plurality of longitudinal shelves;
    at least two support arms, wherein the support arms are capable of grasping a first shelf of the plurality of longitudinal shelves that is located above a second shelf of the plurality of the longitudinal shelves, and shifting the first shelf laterally such that no portion of the shelf is located at the same vertical plane as any of the other shelves,
    wherein the at least two support arms are further capable of moving vertically to adjust the height of the first of the plurality of longitudinal shelves, and retract such that the first shelf is located below the second shelf;
    wherein one or more of the plurality of longitudinal shelves comprises one or more proximity sensors, wherein one or more of the plurality of longitudinal shelves determines whether there is an obstruction in the movement path of the one or more of the plurality of longitudinal shelves using the one or more proximity sensors;
    wherein one or more of the plurality of longitudinal shelves generates a second movement path to avoid the obstruction in the movement path.

2. The modular shelf organization system of claim 1, wherein the plurality of longitudinal shelves comprises one or more display items comprising at least one of a shelf or a basket.

3. The modular shelf organization system of claim 1, further comprising a central server that transmits location information to the gondola rack via the communication network, wherein one or more of the plurality of longitudinal shelves is moved along a movement path based on the location information.

4. The modular shelf organization system of claim 1, wherein the plurality of longitudinal shelves comprises a weight sensor, wherein one or more of the plurality of longitudinal shelves are capable of generating an indication of the load on one or more of the plurality of longitudinal shelves.

5. The modular shelf organization system of claim 4, wherein one or more of the plurality of longitudinal shelves is capable of providing an indication that one or more of the plurality of longitudinal shelves is overloaded.

6. The modular shelf organization system of claim 1, wherein one or more of the plurality of longitudinal shelves generates an indication of the obstruction in the movement path.

7. The modular shelf organization system of claim 1, further comprising one or more vertical movement tracks attached to the one or more upright support members, wherein the plurality of longitudinal shelves engage with the vertical movement track.

8. The modular shelf organization system of claim 7, wherein one or more of the plurality of longitudinal shelves further comprises one or more gears, and the one or more vertical movement tracks further comprises one or more teeth that engage with the one or more gears.

9. The modular shelf organization system of claim 7, wherein one or more of the plurality of longitudinal shelves further comprises one or more pegs, and the one or more vertical movement tracks further comprises one or more notches that engage with the one or more pegs.

10. The modular shelf organization system of claim 7, wherein the one or more vertical movement tracks further comprises one of a belt or chain and one or more motorized elements that drive the belt or chain.

* * * * *